Dec. 26, 1939.  F. M. YOUNG  2,184,658
RADIATOR
Filed Aug. 26, 1936   2 Sheets-Sheet 1
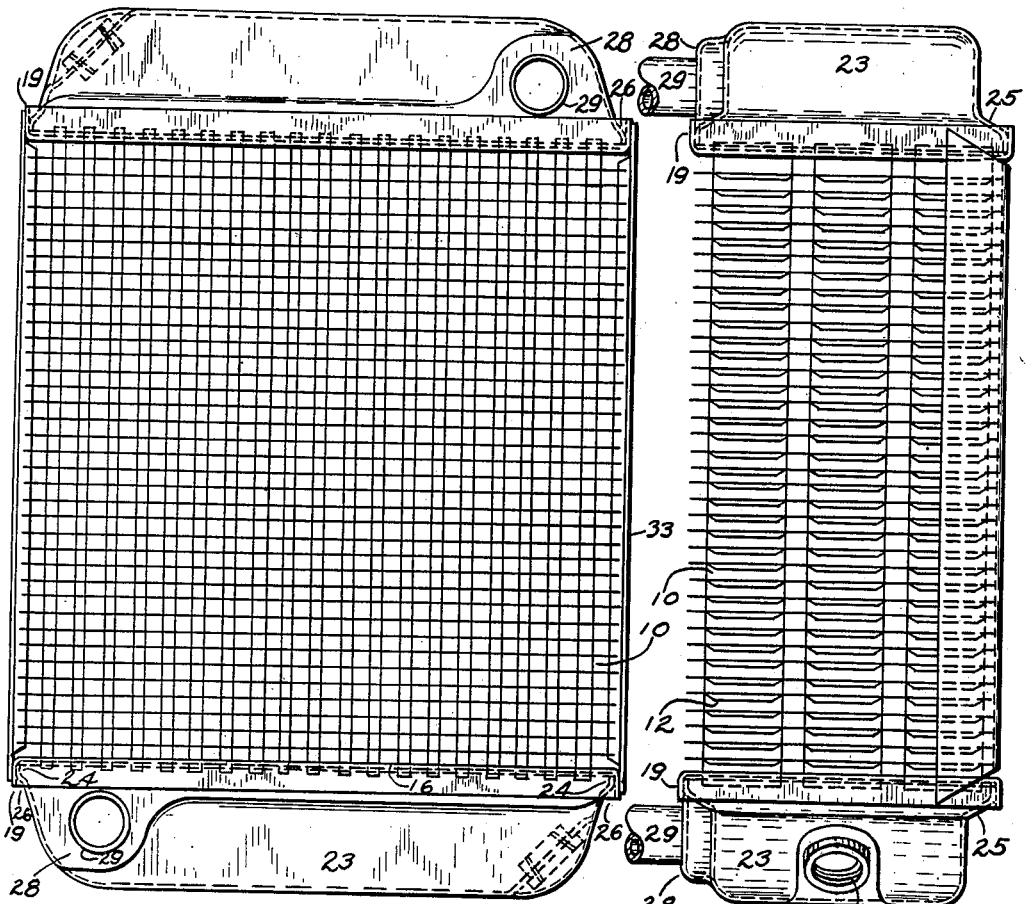
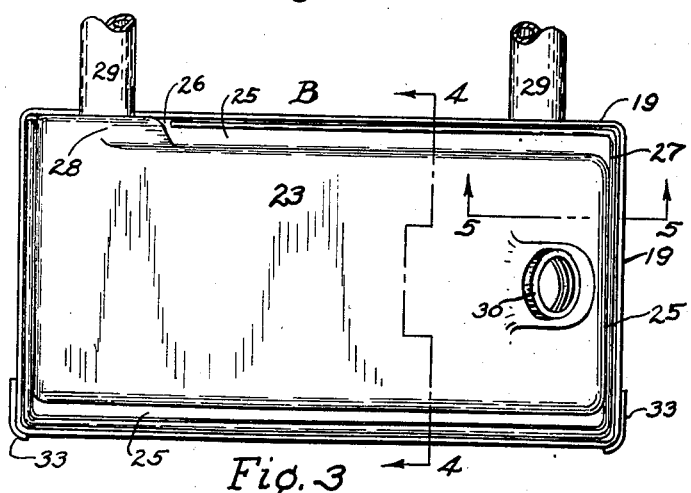
INVENTOR
Fred M. Young
BY A. S. Krotz
Attorney Dec. 26, 1939.  F. M. YOUNG  2,184,658
RADIATOR
Filed Aug. 26, 1936   2 Sheets-Sheet 2

INVENTOR
Fred M. Young
BY A. S. Knoth
Attorney

Patented Dec. 26, 1939

2,184,658

UNITED STATES PATENT OFFICE 2,184,658

RADIATOR

Fred M. Young, Racine, Wis.

Application August 26, 1936, Serial No. 97,964

2 Claims. (Cl. 257—130)

The present invention relates principally to radiators commonly used as car heaters and the like and has for its objects a simple efficient device which may be manufactured at low cost.

One of the difficulties in manufacturing cores of the class is caused by the frail nature of the material used and the necessity for bonding the multiplicity of parts together so as to provide a gas or water tight structure.

I accomplish the desired results by means of novel tube plates and novel sheets of solder or bonding material as will hereinafter appear.

To these and other useful ends my invention consists of parts and combinations thereof or their equivalents as herein described and claimed and shown in the accompanying drawings in which:

Fig. 1 is a rear elevation of the preferred form of my invention.

Fig. 2 is a side elevation of the device as shown in Figure 1.

Fig. 3 is a top view of the device.

Figure 7:
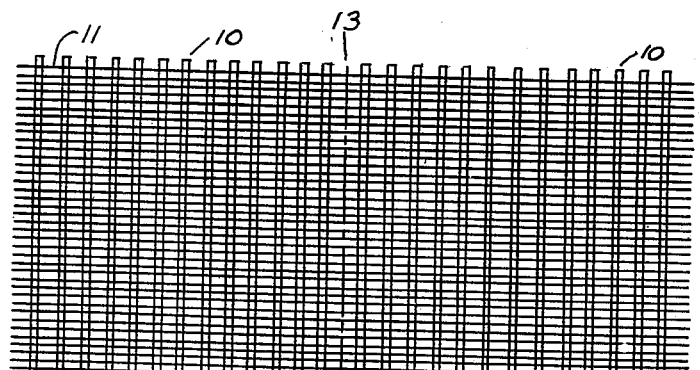
Fig. 7 is a front elevation of the double core before being separated, preparatory to securing the tube plates to the tube ends.
Figure 8:
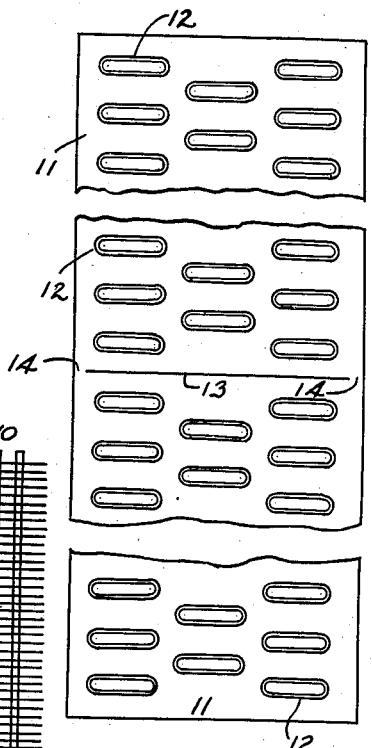
Fig. 8 is a fractional top view of the fin from which the assembly shown in Figure 7 is made.
Figure 10:
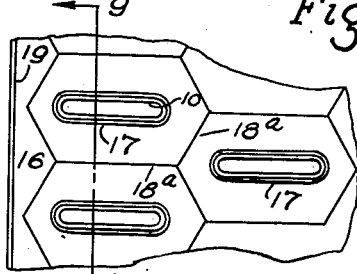
Fig. 10 is a fractional top view of the tube plate showing the ends of the tubes as positioned in the flanged openings.
Figure 9:
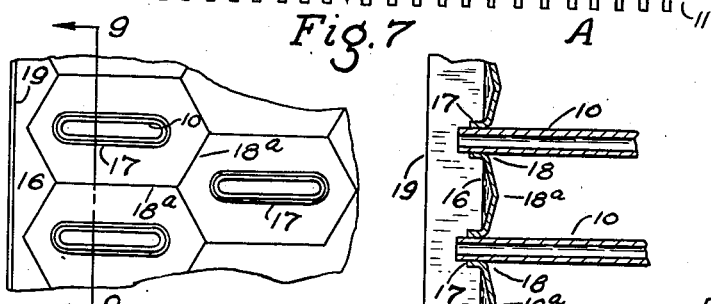
Fig. 9 is a section taken on line 9—9 of Figure 10.

As thus illustrated the present invention comprises a primary core (see Figure 7) which in its entirety is designated by reference character A. This core comprises preferably flattened tubes 10 having thereon a multiplicity of closely spaced fins 11 through which the tubes extend, the practice being to provide flanged openings for the reception of the tubes. These flanges are pointed out by numeral 12 in the various drawings. At the longitudinal center of fin 11 as shown in Figure 8, the material is cut free transversely as at 13, leaving intact narrow portions 14—14. After core A has been formed as illustrated in Figure 7 and the assembly passed through a heating oven for the purpose of bonding fin flanges 12 to the tubes, portions 14 are cut through by means of a band saw thus to provide two cores with which to make the assembly as illustrated in Figures 1, 2 and 3, the tubes having been tinned previous to assembling the fins thereon.

I provide upper and lower tube plates 16 each having flanged openings 17 through which tubes 10 extend as clearly illustrated in Figures 4, 5, 9 and 10. When the flanged openings are formed in plates 16, the material is depressed somewhat around this opening as at 18 forming apexes between the tubes as at 18a and projecting on opposite sides from flanges 17. The purpose of these depressions will be hereinafter explained. Plates 16 are provided with flanges 19 which extend in the same direction as flanges 17.

I provide header caps 23 having outer flanges 24 which fit snugly within flanges 19, having inwardly turning sides as at 25, forming V shaped channels 26 for the reception of shaped bonding wires 27 as illustrated in Figure 3. Formed portions 28 are provided into which inlet and outlet tubes 29 are suitably secured. Header caps 23 are positioned on their respective tube plates whereby tubes 29 are positioned on opposite corners of the unit. I provide suitable flanged openings in header caps 23, for the reception of flanged sleeve 30 having a suitable pipe threaded opening as illustrated. Generally, however, the top header is supplied with a valve in this opening suitable for conveniently permitting the escape of air, the other opening being closed by means of a pipe plug.

Figure 4:
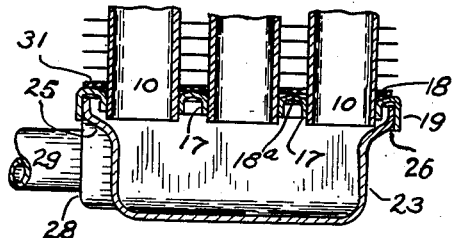
Fig. 4 is a fractional transverse section of the device taken on line 4—4 of Figure 3.
Figure 5:
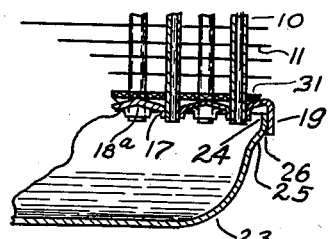
Fig. 5 is a fractional section taken on line 5—5 of Figure 3.

I provide member 31 which is formed exactly like a half of member 11 less the flanges. This member is made from solder or a suitable bonding material and is positioned on the tube ends as indicated in Figures 4 and 5. The tube plate is then positioned on the tube ends, acid is then applied and the bottom of the assembly subjected to heat in a suitable manner so as to melt member 31 which is then directed around the tubes at the bottom of channels 18 whence it will flow between the tube ends and their flanges making a suitable bonded joint therebetween. The ends of the unit are then reversed and bonded in like manner.

Figure 6:
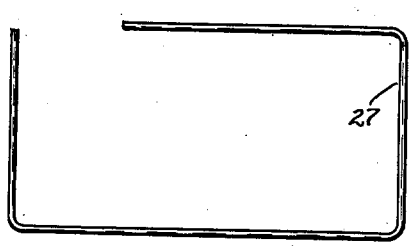
Fig. 6 illustrates a shaped piece of wire solder as used for bonding the header cap to the tube plate.

The header caps 23 are now placed on the tube plates as illustrated in Figures 1 to 3 inclusive, and the cap at the top of the unit bonded as follows: first the wire solder member 27 shown in Figure 6, is laid in groove 26, as illustrated in Figure 3 and acid and heat applied, melting the wire solder which flows down and between flanges 19 and 24, forming a sealed joint.

the other end is then turned up and similarly bonded. Thus it will be seen that the radiator may be assembled and bonded in consecutive order and in a most effective and economical manner.

I provide two angle bar members 33 having a wide and a narrow lip which are formed at their ends as illustrated, the wide lips at their ends contacting and being bonded to flanges 19 as illustrated, leaving the narrow portion flush with the front of flange 19 as clearly shown in Figure 2. Thus the front corners of fins 11 are protected without materially restricting the flow of air through the core.

Clearly bonding strip 31 may be dispensed with and the end dipped into molten bonding material the channels acting to direct the molten material around the tubes and cause it to form a small fillet at the bottom of the channel.

Having thus shown and described my invention I claim:

1. A radiator core of the class described, comprising a number of tubes and a multiplicity of spaced fins through which said tubes extend, tube plates having outwardly extending flanges for the reception of header caps, the tube openings in said plates being outwardly flanged and each being surrounded on the opposite side from said flanges, by a depression formed by shallow inverted V shaped surfaces the apexes of which are midway said flanges, said tubes being bonded to said flanged openings by placing a thin plate of bonding material shaped similar to said fins less the flanges, and positioned on the tube ends ahead of said tube plates and turning the plate end to be bonded down and applying heat whereby said bonding plate is made molten and caused to flow between the tube ends and their flanges.

2. A radiator core of the class described, comprising a number of tubes and a multiplicity of spaced fins through which said tubes extend being bonded thereto, tube plates having outwardly extending flanges for the reception of header caps, the tube openings in said plates being outwardly flanged and each being surrounded on the opposite side from said flanges by a depression formed by inverted V shaped surfaces the apexes of which intersect and surround said flanges, said tube ends and tube plate flanges being bonded together by applying heat and bonding material in said depressions.

FRED M. YOUNG.